United States Patent [19]

Putzar

[11] Patent Number: 4,487,609
[45] Date of Patent: Dec. 11, 1984

[54] POWDERED, STABLY DISPERSIBLE, NON-FOAMING DYE FORMULATIONS AND PROCESS FOR THEIR PREPARATION

[75] Inventor: Roland Putzar, Hofstetten, Switzerland

[73] Assignee: Ciba-Geigy Corporation, Ardsley, N.Y.

[21] Appl. No.: 520,655

[22] Filed: Aug. 5, 1983

[30] Foreign Application Priority Data

Aug. 16, 1982 [CH] Switzerland ................. 4905/82

[51] Int. Cl.$^3$ .................. C09B 67/38; D06P 1/651
[52] U.S. Cl. ............................. 8/524; 8/522; 8/609
[58] Field of Search ........................... 8/524

[56] References Cited

U.S. PATENT DOCUMENTS 3,960,486 6/1976 Daubach et al.
4,225,311 9/1980 Niimi et al. ..................... 8/524

FOREIGN PATENT DOCUMENTS 54-30983 3/1979 Japan ........................ 8/609

Primary Examiner—Maria Parrish Tungol
Attorney, Agent, or Firm—Edward McC. Roberts

[57] ABSTRACT

The invention relates to powdered, stably dispersible dye formulations which do not foam on application, and to a process for their preparation. In addition to containing one or more disperse dyes and an anionic dispersant or mixture of dispersants, these formulations contain 0.01 to 10% by weight, based on the final formulation, of a non-ionic reaction product of ethylene oxide and propylene oxide with a low molecular polyol, said reaction product having a molecular weight in the range from 200 to 5000 and a cloud point in the range from $-20°$ to $+130°$ C. The formulations are particularly suitable for dyeing under HT conditions in half-filled dyeing machines.

9 Claims, No Drawings

POWDERED, STABLY DISPERSIBLE, NON-FOAMING DYE FORMULATIONS AND PROCESS FOR THEIR PREPARATION

The present invention relates to novel powdered, stably dispersible dye formulations which do not foam on application, even under HT conditions, and with which speckle- and spot-free dyed goods are obtained.

Powdered disperse dye formulations often contain anionic dispersants such as lignosulfonates or formaldehyde/naphthalenesulfonic acid condensates, as well as surfactants. The addition of these substances often causes the dye liquor to foam vigorously when dyeing in half-filled dyeing machines, resulting in unlevel dyeings. Foaming is especially troublesome in jet dyeing machines, for the foam impedes the flow of substrate through the jet and can lead to transport of the goods coming to a complete stop.

To inhibit foam formation it is customary to add fairly large amounts of antifoam before or during the dyeing procedure. Aside from the fact that this measure necessitates an additional reaction step, it is undesirable to add such substances. For example, silicone antifoams can lead to soiling of machines and goods.

Further, the preparation and storage of powdered disperse dye formulations involves problems. Such dye formulations are usually prepared by spray drying aqueous dispersions. In the course of drying, especially whenever the concentration of dye in the dry formulation is in the region of or above 40% by weight, agglomeration of the finely divided dye particles frequently occurs. Such agglomerates lead to the formation of specks or spots on the dyed substrate and consequently to spoiled dyeings.

The agglomeration of the finely disperse dye particles can be prevented, for example by lowering the temperature of entrance into the spray drier or by reducing the concentration of dye relative to the auxiliary, with the result that a lower space-time yield is obtained.

Accordingly, it is the object of the present invention to prepare powdered dye formulations by drying aqueous dye dispersions, which formulations are free from agglomerates and form no agglomerates during storage and, in addition, do not give rise to foaming dye liquors.

It has now been found that dye formulations which, in addition to containing one or more finely divided disperse dyes and an anionic dispersant or mixture of dispersants, also contain 0.01 to 10% by weight, based on the final formulation, of a non-ionic reaction product of ethylene oxide and propylene oxide with a low molecular aliphatic polyol, do not have the shortcomings referred to above, said reaction product having a cloud point in the range from $-20°$ to $+130°$ C. and a molecular weight in the range from 200 to 5000.

Preferred alkoxylation products are those which are obtained by the reaction of ethylene oxide and propylene oxide with a branched or unbranched polyol containing 2 to 6 carbon atoms.

Preferred polyols are in particular ethylene glycol, propylene glycol, glycerol or pentaerythritol.

The formulations of this invention preferably contain those alkoxylation products having a molecular weight in the range from 1000 to 3000 and in which the molar amount of hydrophobic propylene oxide is greater than that of hydrophilic ethylene oxide.

Particularly useful polyol/alkoxylation products on account of their pronounced antifoam properties are those having a molecular weight of 1000 to 3000 and which contain about 3 moles of propylene oxide per mole of ethylene oxide. It is also advantageous to use those alkoxylation products which have a cloud point in the range from 0° to 50° C.

It is also possible to use mixtures of reaction products of different polyols. These mixtures are obtained by simple mixing of individual reaction products or direct by alkoxylating a mixture of different polyols.

The ethylene oxide/propylene oxide/polyol reaction products are known or they can be prepared by methods which are known per se (reference is made in this connection to e.g. N. Schönfeldt, Grenzflächenaktive Aethylenoxid-Addukte, Wissenschaftliche Verlagsgesellschaft mbH, Stuttgart, 1976). In principle, the reaction products may be prepared by reacting the polyol first with ethylene oxide and then with propylene oxide, or conversely first with propylene oxide and then with ethylene oxide. It is advantageous to use those reaction products which have been obtained by reaction of the polyol with propylene oxide and subsequent condensation with ethylene oxide.

The formulations preferably contain 0.05 to 5% by weight of alkoxylation product, based on the final formulation. However, the alkoxylation products may also be added to the formulations in a concentration higher than 10%, provided powdered formulations of solid consistency with no tendency to clumping are obtained after drying. Surprisingly, such alkoxylation products act as foam inhibitors in the dye liquor when using the formulations of this invention, and at the same time they prevent the formation of dye agglomerates both in the preparation and storage of the dye formulations. In addition, the alkoxylation products act as dust inhibitors and thus facilitate the preparation and use of the dye formulations.

The disperse dyes contained in the formulations of this invention are chiefly azo and anthraquinone dyes, as well as nitro, methine, styryl, azostyryl, naphthoperinone, quinophthalone or naphthoquinoneimine dyes which do not contain water-solubilising groups. In finely ground state, these dyes form very fine aqueous suspensions with the aid of dispersants. Disperse dyes will also be understood as meaning water-insoluble fluorescent whitening agents. These compounds may belong to different classes, e.g. coumarins or pyrazolines. It is also possible to use mixtures of the same or different types of dye or fluorescent whitening agent as defined herein in the powdered formulations of this invention. Instead of disperse dyes, other classes of dye may also be used, e.g. vat dyes.

Suitable anionic dispersants are in particular lignosulfonates, e.g. those obtained by the sulfite or kraft process. They are preferably products which are partially hydrolysed, oxidised or desulfonated or, if they have been obtained by the kraft process, are post-sulfonated or sulfomethylated, and are fractionated by known methods, e.g. according to molecular weight or degree of sulfonation. Mixtures of sulfite- and kraft-lignosulfonates are also very effective. Particularly suitable lignosulfonates are those having an average molecular weight from 1000 to 80,000, an active lignosulfonate content of at least 80% and preferably a low content of polyvalent cations. The degree of sulfonation may vary within wide limits. The ratio of carbon to organically bound sulfur is e.g. from 9:1 to 55:1.

It is preferred to use those lignosulfonates in which the ratio of carbon to organically bound sulfur is 17:1 to 40:1. The more hydrophobic lignosulfonates which are effective at high temperature have proved particularly useful.

Useful anionic dispersants for the formulations of this invention are also condensates of aromatic sulfonic acids and formaldehyde, such as condensates of aromatic sulfonic acids with formaldehyde, e.g. condensates of formaldehyde and naphthalenesulfonic acids or of formaldehyde, naphthalenesulfonic acid and benzenesulfonic acid, or a condensate of crude cresol, formaldehyde and naphthalenesulfonic acid. Further anionic dispersants are sulfated alkylene oxide adducts, sulfated, partially esterified polyhydric alcohols, alkylsulfonates, sodium dialkylsulfosuccinates, alkylbenzenesulfonates, condensates of ditolyl ether, formaldehyde and sulfuric acid, condensates of chloromethylolated diphenyls, naphthalene and sulfuric acid, condensates of monocyclic aromatic compounds, formaldehyde, naphtholsulfonic acids and, if appropriate, sodium sulfite, or condensates of naphthalene, toluene, formaldehyde and sulfuric acid. It is preferred to use mixtures of the anionic dispersants mentioned above.

The anionic dispersants are usually in the form of their alkali metal salts, ammonium salts or water-soluble amine salts. It is advantageous to use dispersants having a low content of elctrolytes.

The dye formulations of the present invention contain preferably 25 to 60% by weight, most preferably 30 to 50% by weight, of one or more disperse dyes, 30 to 70% by weight of an anionic dispersant or mixture of dispersants, and 0.1 to 3% by weight of an alkoxylation product as defined at the outset.

If desired, further ingredients which improve the characteristics may be added to the dye formulations, e.g. binders or also lubricants which facilitate the transport of the goods in jet dyeing. In addition to the alkoxylation products, the formulations may also contain other non-ionic surfactants, e.g. 2,4,7,9-tetramethyl-5-decyn-4,7-diol, which on the one hand acts as spray auxiliary and, on the other, partly further enhances the antifoam action of the alkoxylation products.

Preferred dye formulations comprise e.g. fomulations containing 30 to 50% by weight of the disperse dye of the formula

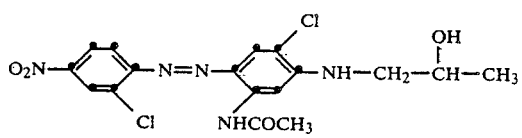

40 to 60% by weight of a lignonsulfonate, 1 to 5% by weight of a naphthalene/formaldehyde condensate and 0.1 to 3% by weight of a non-ionic reaction product of glycerol or propylene glycol with ethylene oxide and propylene oxide (ratio ~ 1:3), said reaction product having a molecular weight of about 2000; or formulations containing 30 to 50% by weight of a mixture of disperse dyes of the formula

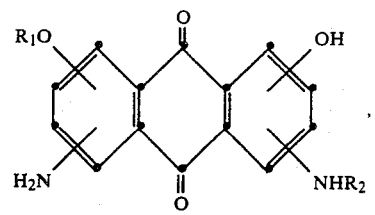

wherein $R_1$ is hydrogen if the radical is $\alpha$-orientated and methyl if the radical is $\beta$-orientated, and $R_2$ is hydrogen or phenyl, 40 to 60% of a lignosulfonate, 1 to 5% by weight of a naphthalenesulfonate/formaldehyde condensate and 0.1 to 3% by weight of a non-ionic reaction product of glycerol or propylene glycol with ethylene oxide and propylene oxide (ratio ~ 1:3), said reaction product having a molecular weight of about 2000.

The novel powdered dye formulations are prepared e.g. by mixing one or more disperse dyes (preferably as crude dye), in water, with at least one anionic dispersant as described herein and/or the non-ionic auxiliary, and subjecting the mixture to wet grinding, e.g. in an agitator ball mill or sand mill, until the particle size of the comminuted disperse dye is less than 10 $\mu$m, preferably smaller than 2 $\mu$m. The other components are added during or after the grinding procedure. The dye dispersion so obtained is dried to give a powdered formulation.

Suitable drying aggregates are spray driers, thin-layer contact driers, e.g. roller driers, continuous paddle driers and others. Spray driers are preferred. Because of the surface action, the alkoxylation product lowers the surface tension of the dye dispersion at temperatures below the cloud point and so facilitates spray drying.

It is also possible to use the liquid dye dispersion direct and, as such, to add it to the dyebath. The observation has also been made that, when using dyes which have only a slight tendency to agglomerate, it suffices to apply the non-ionic auxiliary to the powdered formulation in a subsequent step, e.g. by spraying, instead of incorporating it into the formulation.

The novel stably dispersible dye formulations with which dyebaths are obtained that no not foam even under HT conditions, are suitable for dyeing organic material, especially synthetic textile material, continuously or discontinuously, e.g. materials made from cellulose triacetate, synthetic polyamides and, preferably, polyester such as polyethylene glycol terephthalate. The formulations of this invention are particularly suitable for dyeing polyester fabrics in half-filled jet dyeing machines.

The invention is illustrated by the following Examples, in which percentages are by weight.

EXAMPLE 1

40 g of the red disperse dye of the structural formula

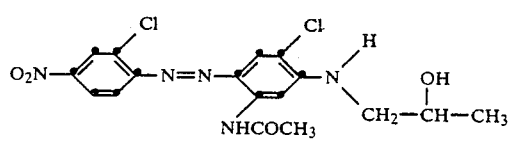

51 g of a lignosulfonate, 3 g of a naphthalenesulfonate/formaldehyde condensate and 1 g of a reaction product of propylene glycol with ethylene oxide and propylene oxide (ratio ~1:3), mol. wt. about 2000, and 140 g of water, are ground in an attrition mill to a particle size of about 1 to 2 μm. The milled material is spray dried at 160° C. entry temperature and 85° C. outlet temperature, to give a powder which redisperses readily in water.

When this formulation is used for dyeing PES by the HT exhaust method in a half-filled jet dyeing machine, a red level dyeing is obtained. In contrast to other dye formulations which give rise to foaming liquors under dyeing conditions, the addition of the propylene glycol/propylene oxide/ethylene oxide condensate permits dyeing with insignificant foaming, especially in the critical high temperature range. The absence of foam is an essential condition for jet dyeing, as only in this way can the substrate flow unhindered through the jet.

EXAMPLE 2

42.4 g of the dark blue mixture of disperse dyes of the formula

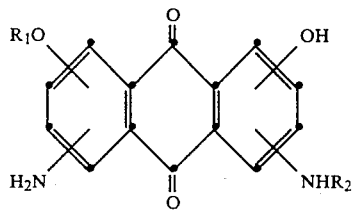

wherein $R_1$ is hydrogen when the radical is α-orientated and methyl when the radical is β-oriented, and $R_2$ is hydrogen or phenyl, 49.1 g of a lignosulfonate, 3 g of a naphthalenesulfonate/formaldehyde condensate and 0.5 g of the propylene glycol/propylene oxide/ethylene oxide condensate of Example 1, are finely ground. The dye dispersion so obtained is spray dried, to give a powdered, stably dispersible dye formulation.

EXAMPLE 3

The yellow vat dye of the structural formula

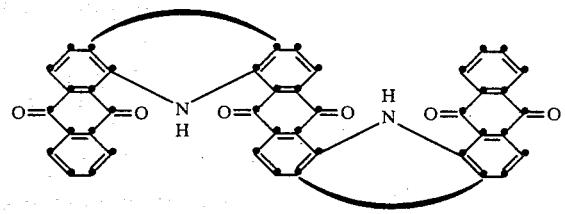

and a lignosulfonate are formulated by wet grinding and spray drying to a powder containing 33% of dye. By adding 2% of the propylene glycol alkoxylation product of Example 1 before or after drying, there is obtained a substantially non-dusty product which does not give rise to troublesome foam formation in high-speed dyeing machines. The dyeings obtained are level.

EXAMPLE 4

500 g of polyester fabric are dyed in a half-filled laboratory jet dyeing machine. The dye liquor contains 10 g of the dye formulation of Example 1. No noticeable foaming occurs in the dyeing machine during the entire dyeing procedure, particularly in the HT range. Level red dyeings which are fast to rubbing are obtained after finishing.

If dye formulations which, instead of the alkoxylation product of this invention, contain e.g. N-oleyl methyl tauride or an alkylphenol ethoxylate (e.g. nonylphenol pentadecyglycol ether), then foam forms in the jet liquor and unlevel dyeings are obtained.

What is claimed is:

1. A powdered, stably dispersible dye formulation which does not foam on application and comprises one or more disperse dyes and one or more anionic dispersants, which formulation additionally comprises 0.01 to 10% by weight, based on the final formulation, of a non-ionic alkoxylation product which is a reaction product of ethylene oxide and propylene oxide with a low molecular weight aliphatic polyol, said alkoxylation product having a cloud point in the range of −20° to +130° C., a molecular weight in the range of 1000 to 3000 and a propylene oxide-ethylene oxide molar ratio greater than 1.

2. A dye formulation of claim 1, wherein the aliphatic polyol contains 2 to 6 carbon atoms.

3. A dye formulation of claim 2, wherein the aliphatic polyol is ethylene glycol, propylene glycol, glycerol or pentaerythritol.

4. A dye formulation of claim 1, wherein the propylene oxide-ethylene oxide molar ratio is about 3.

5. A dye formulation of claim 1, wherein the alkoxylation product has a cloud point in the range of 0° to 50° C.

6. A dye formulation of claim 1, which contains 0.05 to 5% by weight of alkoxylation product.

7. A dye formulation of claim 1, which contains 25 to 60% by weight of one or more disperse dyes, 30 to 70% by weight of an anionic dispersant or mixture of dispersants, and 0.1 to 3% by weight of the alkoxylation product, in each case based on the final formulation.

8. A dye formulation of claim 7, which contains 30 to 50% of one or more disperse dyes.

9. A process for the preparation of a dye formulation, which comprises adding 0.01 to 10% by weight, based on the final formulation, of a non-ionic alkoxylation product which is a reaction product of ethylene oxide and propylene oxide with a low molecular weight aliphatic polyol, before drying, to an aqueous dispersion of one or more disperse dyes containing an anionic dispersant or mixture of dispersants, said alkoxylation product having a molecular weight of 1000 to 3000, a cloud point in the range of −20° to +130° C. and a propyleneoxide-ethylene oxide molar ratio greater than 1.

* * * * *